US007112946B2

(12) United States Patent
Owen

(10) Patent No.: US 7,112,946 B2
(45) Date of Patent: Sep. 26, 2006

(54) TRANSFORMER WITH SELECTABLE INPUT TO OUTPUT PHASE ANGLE RELATIONSHIP

(76) Inventor: Donald W. Owen, 5410 Onset Bay Dr., Rowlett, TX (US) 75089

( * ) Notice: Subject to any disclaimer, the term of this patent is extended or adjusted under 35 U.S.C. 154(b) by 104 days.

(21) Appl. No.: 10/899,728

(22) Filed: Jul. 27, 2004

(65) Prior Publication Data

US 2006/0022783 A1 Feb. 2, 2006

(51) Int. Cl.
*G06F 1/14* (2006.01)
*H01F 30/12* (2006.01)

(52) U.S. Cl. .......................... 323/255; 336/5; 323/361

(58) Field of Classification Search .................... 336/5; 323/361, 255
See application file for complete search history.

(56) References Cited

U.S. PATENT DOCUMENTS 3,725,833 A * 4/1973 Thomas ...................... 336/146
3,769,570 A * 10/1973 Stairs ............................ 363/3
4,156,186 A * 5/1979 Wolfinger ................... 324/108
4,366,532 A * 12/1982 Rosa et al. ................... 363/69
4,514,635 A 4/1985 Ishida et al.
4,517,635 A * 5/1985 Kelley, Jr. .................. 363/136
4,736,147 A 4/1988 Shizhang
4,763,147 A * 8/1988 Vogt ............................ 396/50
5,703,767 A * 12/1997 Stacey ......................... 363/40

* cited by examiner

*Primary Examiner*—Anh Mai
(74) *Attorney, Agent, or Firm*—Dillon & Yudell LLP

(57) ABSTRACT

A three-input induction transformer in which the phase relationship of the power output relative to the power input is selectable/adjustable after the transformer is placed in operation in the field. The transformer includes a primary set of windings and a three-pole, selector mechanism attached to the windings and which configures the windings in one of multiple serial configurations based on the selected position of the selector mechanism. Each transformer is configured so that the output-to-input phase relationship rotates a predetermined number of degrees when the connectivity of the three-pole selector mechanism is changed.

18 Claims, 10 Drawing Sheets

TRANSFORMER WITH SELECTABLE INPUT TO OUTPUT PHASE ANGLE RELATIONSHIP

TECHNICAL FIELD

The present invention relates generally to transformers and in particular to transformers with which the phase angle relationship of the output is selectable/adjustable relative to the input.

DESCRIPTION OF THE RELATED ART

Different types of transformers have been designed and manufactured to meet different needs. Each transformer design exhibits different performance/operational characteristics, including different input-to-output voltage, different power ratios, and different phase shift relationships. One conventional transformer is a three-input induction transformer. This transformer includes a three-phase input to a primary winding and provides a three phase output from a secondary winding to the attached load.

One measured characteristic/phenomena with these conventional three-input induction transformers is the transmission of harmonic distortions between the output power signal and the input power signal. These harmonic distortions may result from attempts by the designer to control the speed of a three-phase induction motor by using an electronic variable frequency drive (VFD). The VFD has a rectifier circuit that requires multiple phases of alternating current electric power. For example, a six-pulse rectifier needs three phases of electric power to be input so that six pulses are provided by the full-wave rectification.

Although multi-phase rectifiers are useful, they cause detrimental harmonic currents to flow in the input power source. For example, the current in a six-pulse VFD is heavily laden with fifth and seventh harmonics. Harmonic currents can cause system components such as transformers and generators to overheat. Harmonic currents also can cause voltage distortion. Voltage distortion can cause electronic devices to malfunction and capacitors to overheat. Multiple rectifiers powered by one power source intensify the harmonic problems because the total harmonic current is increased proportional to the total rectifier load.

Primary system filters can be used to prevent or attenuate this harmonic distortion. Such filters are, however, designed and applied for a predetermined amount of total drive load, which load cannot always be known with certainty prior to an actual installation. Even when initially predicted, the load may be changed as rectifiers are added to or removed from the system. This may necessitate a change in the filter because the total drive load that can be connected to a filtered system is limited by the design of the filter and not by the capacity of the power system. Additionally, such filters typically are relatively large and expensive.

SUMMARY OF THE INVENTION

Disclosed are a series of three-input induction transformers in which the phase relationship of the power output relative to the power input is selectable/adjustable after the transformer is placed on location in the field. The design of the transformers includes a primary set of windings and a three-pole, double throw selector switch connected to the windings and which configures the windings in one of two configurations based on the selected position of the switch. The primary set of windings is arranged in a zigzag pattern with three knees. Each knee of the zigzag is selectably established by one of three poles of the three-pole, double-throw selector switch. The transformer also includes a secondary set of windings that are electromagnetically coupled to the primary set of windings.

Each of the transformers is arranged so that the input-to-output phase relationship rotates a pre-determined number of degrees when the three-pole selector switch is thrown. To support this operational characteristic, the segments of the primary windings' zigzags are designed with a turns ratio that yields this pre-determined degrees of phase shift. In the illustrative embodiments, the turns ratio is selected to be as close to the desired ratio as practical, rounded to the nearest whole number of turns or a whole number of turns plus one-half. Corresponding ends of three first segments of the zigzag are arranged as fixed input terminals, and corresponding ends of the other/second three segments are arranged as the fixed neutral point of the primary windings. The remaining six ends of the zigzag segments are arranged as selectable, isolated zigzag knee connections, via the selector switch.

The secondary windings may be arranged in any configuration known in the art. One useful configuration is polygon connected windings, providing two three-phase outputs. One output lags the other output by a predetermined number of (phase angle) degrees. Each output includes three terminals that enable a three phase load to be connected.

The above as well as additional objectives, features, and advantages of the present invention will become apparent in the following detailed written description.

BRIEF DESCRIPTION OF THE DRAWINGS

The invention itself and further objects and advantages thereof will best be understood by reference to the following detailed description of an illustrative embodiment when read in conjunction with the accompanying drawings, wherein.

DETAILED DESCRIPTION OF AN ILLUSTRATIVE EMBODIMENT

Figure 1A:
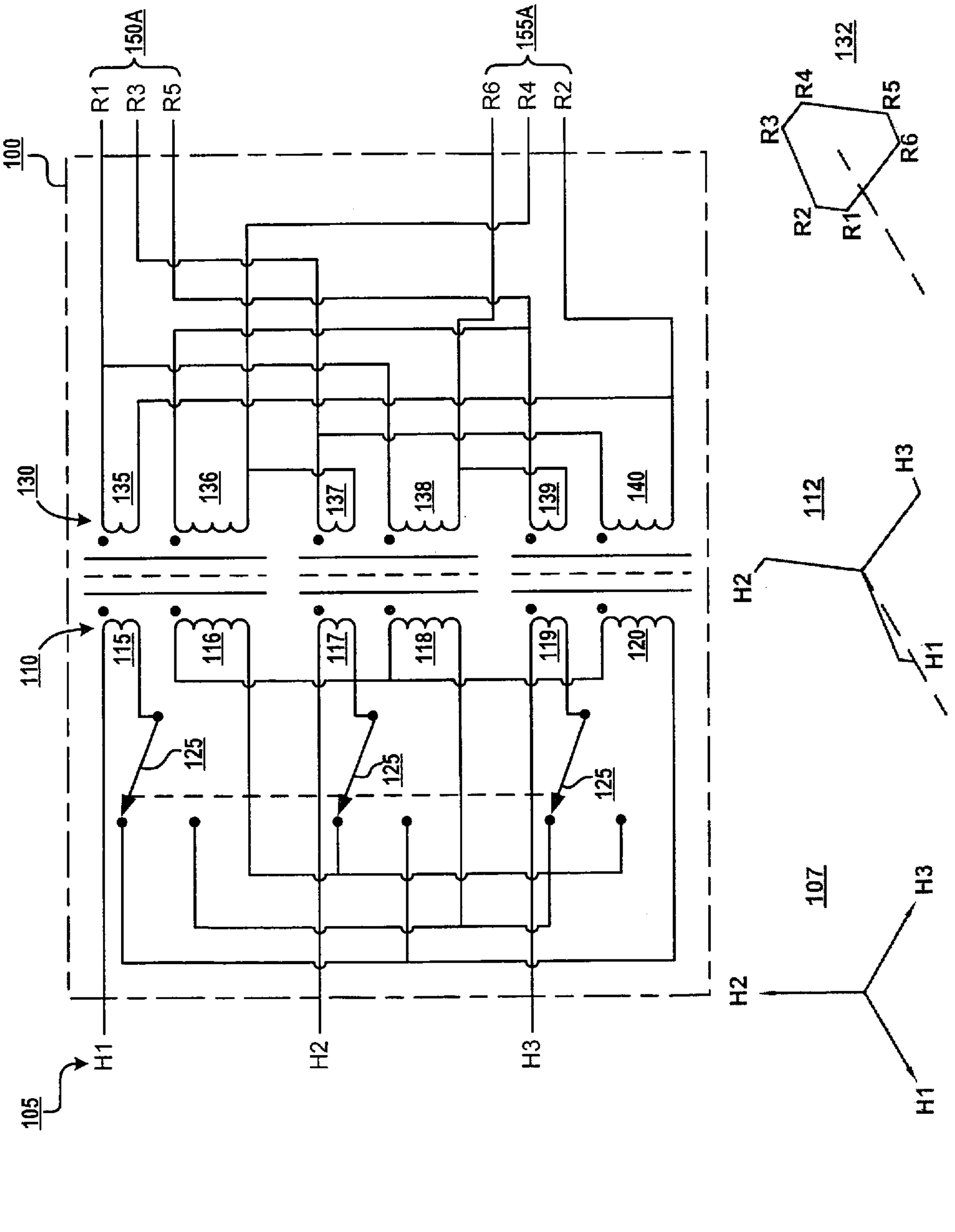
FIGS. 1A and 1B illustrate two schematic and vector diagrams of a first transformer with different, select switch positions according to one illustrative embodiment of the invention.

The present invention provides a series of transformers designed so that the phase angle relationship of the power output relative to the power input is adjustable after the transformer is placed on location in the field. The base design of the transformers includes an input/primary set of windings with a three-pole, selector mechanism that connects to particular ones of the windings to configure the windings in one of multiple configurations based on the connection. The output-to-input phase relationship rotates a pre-determined number of degrees when the connectivity of the three-pole selector mechanism is changed.

In the illustrative and described embodiments below, the selector mechanism is a three-pole, double throw selector switch, which may be positioned to provide one of two configurations of the windings relative to the input. Other embodiments may utilize different types of selector mechanism. For example, in one embodiment, the selector mechanism may be made of links (jumpers) on a terminal board that are adjustable by a user of the transformer.

The primary set of windings is arranged in a zigzag pattern with three knees. Each knee of the zigzag is established by one of three poles of the three-pole, double-throw selector switch. The transformer also includes an output/secondary set of windings that are electromagnetically coupled to the primary set of windings.

Each of the transformers is designed/arranged so that the input-to-output phase relationship rotates a pre-determined number of degrees (e.g., 105°) when the three-pole selector switch is thrown. To support this configuration, the segments of the zigzag are designed with a turns ratio that yields this pre-determined degree phase shift. In the illustrative embodiments, the turns ratio are selected to be as close to the desired ratio as practical, rounded to the nearest whole number of turns or a whole number of turns plus one-half.

Two sets of corresponding segments (i.e., segments with same orientation of windings relative to each other) make up the zigzag (or input windings), and the corresponding segments are made of the same number of turns. In the illustrative embodiments, the first segments are of a different length from the second segments; However, one skilled in the art would appreciate that the invention may be implemented with first and second segments that are identical in length (i.e., have the same number of turns).

Corresponding ends of the first segments of the zigzag are arranged as fixed input terminals, and corresponding ends of the second segments are arranged as the fixed neutral point of the primary windings. The remaining six ends of the zigzag segments are arranged as selectable, isolated zigzag knee connections, via the selector switch.

The secondary windings may be arranged in a polygon that provides two three-phase outputs. One output lags the other output by a predetermined number of (phase angle) degrees. Each output includes three terminals that enable a three phase load to be connected.

As provided by the claims, the key features of the invention provides a transformer that includes the following: (1) at least three input terminals arranged for electrical connection to an external three phase power source; (2) at least three output terminals arranged for electrical connection to an external multiple phase load; and (3) at least a first pair of primary windings, a second pair of primary windings and a third pair of primary windings. Each pair of primary windings has a first winding segment and a second winding segment. Each winding segment has a first end and a second end, and each pair of said primary windings is magnetically coaxial. Further, corresponding first ends of each of three first winding segment is permanently electrically connected to one of the input terminals. Also, corresponding first ends of each of three second winding segments are permanently electrically connected together to form an electrical neutral.

The claimed transformer further includes a connection mechanism having at least a first selectable operating configuration and a second selectable operating configuration arranged for selection after the transformer is placed in the service location. The first selectable operating configuration electrically connects (1) the second end of the first winding segment of the first pair of windings to the second end of the second winding segment of the second pair of windings, (2) the second end of the first winding segment of the second pair of windings to the second end of the second winding segment of the third pair of windings, and (3) the second end of the first winding segment of the third pair of windings to the second end of the second winding segment of the first pair of windings. The second selectable operating configuration electrically connects (1) the second end of the first winding segment of the first pair of windings to the second end of the second winding segment of the third pair of windings, (2) the second end of the first winding segment of the second pair of windings to the second end of the second winding segment of the first pair of windings, and (3) the second end of the first winding segment of the third pair of windings to the second end of the second winding segment of the second pair of windings. With the above configuration, the phase relationship of the transformer output relative to the transformer input when the connection mechanism is positioned in the first operating configuration is different from the phase relationship between the transformer output and the transformer input when the connection mechanism is positioned in the second operating configuration.

With reference now to the figures, there are illustrated five configurations of transformers designed according to the invention, each transformer being presented in pairs, labeled FIG. A and FIG. B. Each of the first four illustrated transformers has somewhat similar construction of a primary winding group with a single phase displaced set of three-phase inputs and a secondary winding group with two phase displaced sets of three-phase outputs. Accordingly, for these four transformers (shown in FIGS. 1–4 (A and B)), one of four phase relationships can be assigned for each transformer and its attached load. The transformer of FIGS. 5A–5B is designed somewhat differently and hence only one of two phase relationships can be assigned for the transformer and its attached load.

Figure 1B:
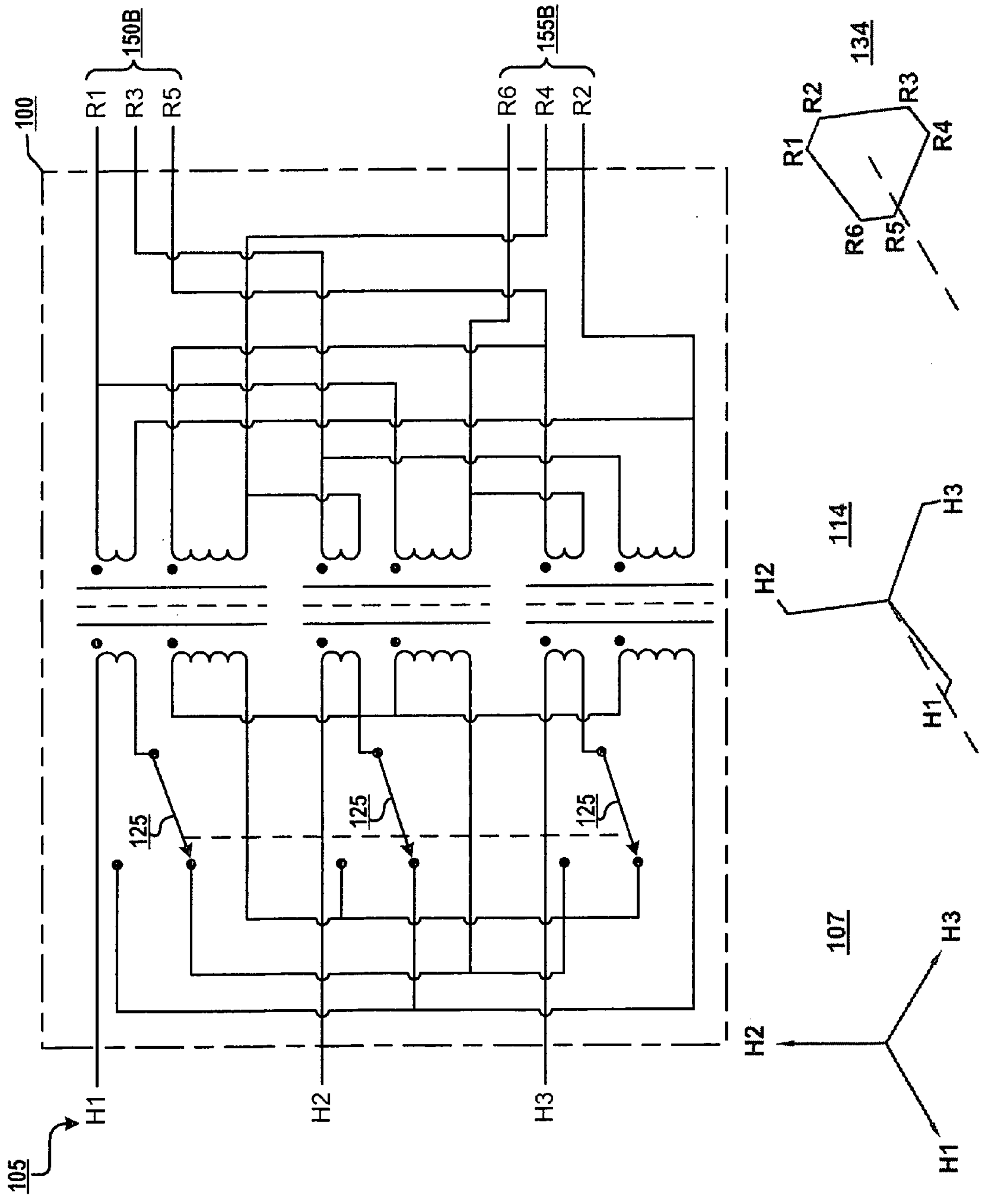
Figure 2A:
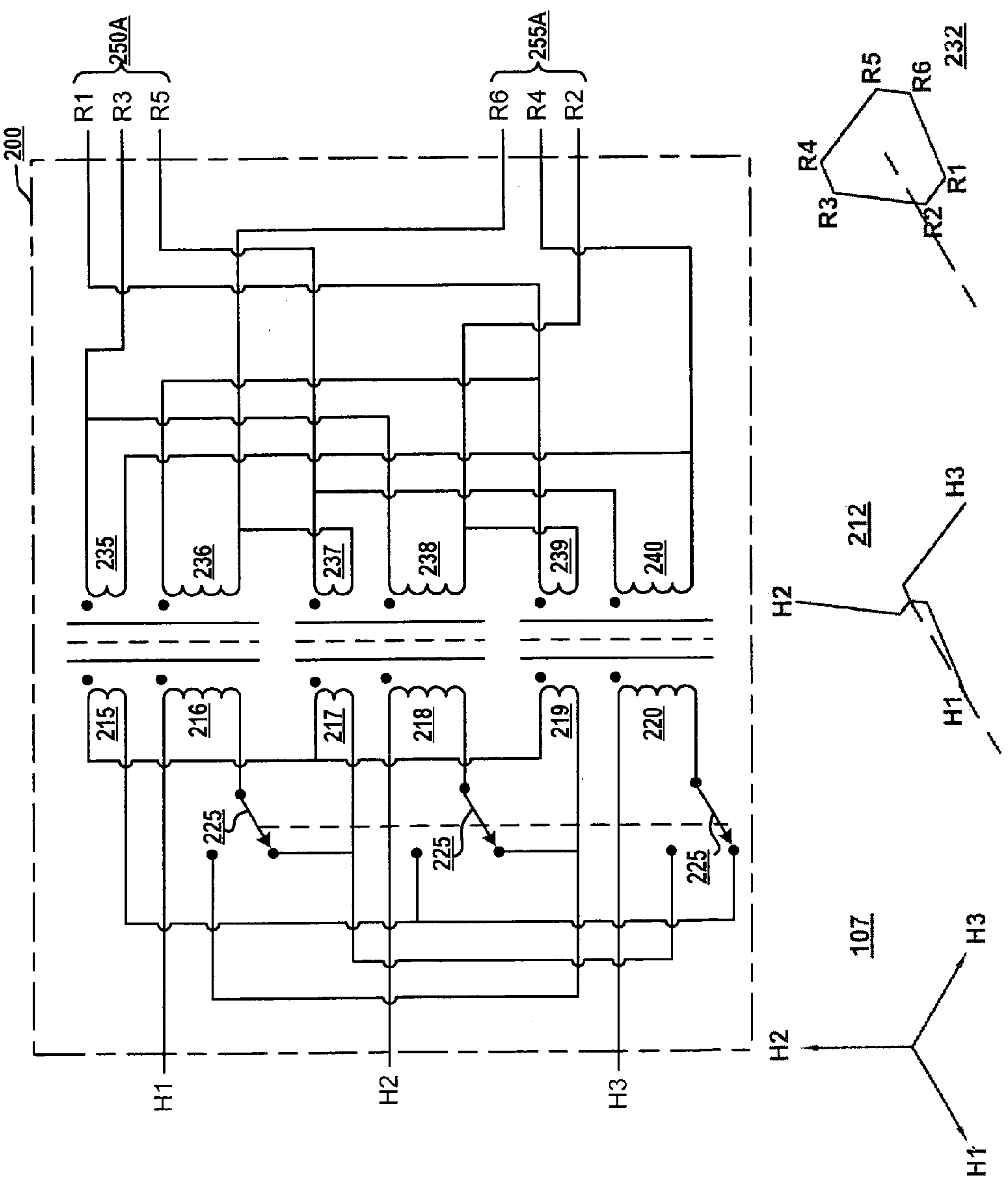
FIGS. 2A and 2B illustrate two schematic and vector diagrams of a second transformer with different, select switch positions according to one illustrative embodiment of the invention.
Figure 2B:
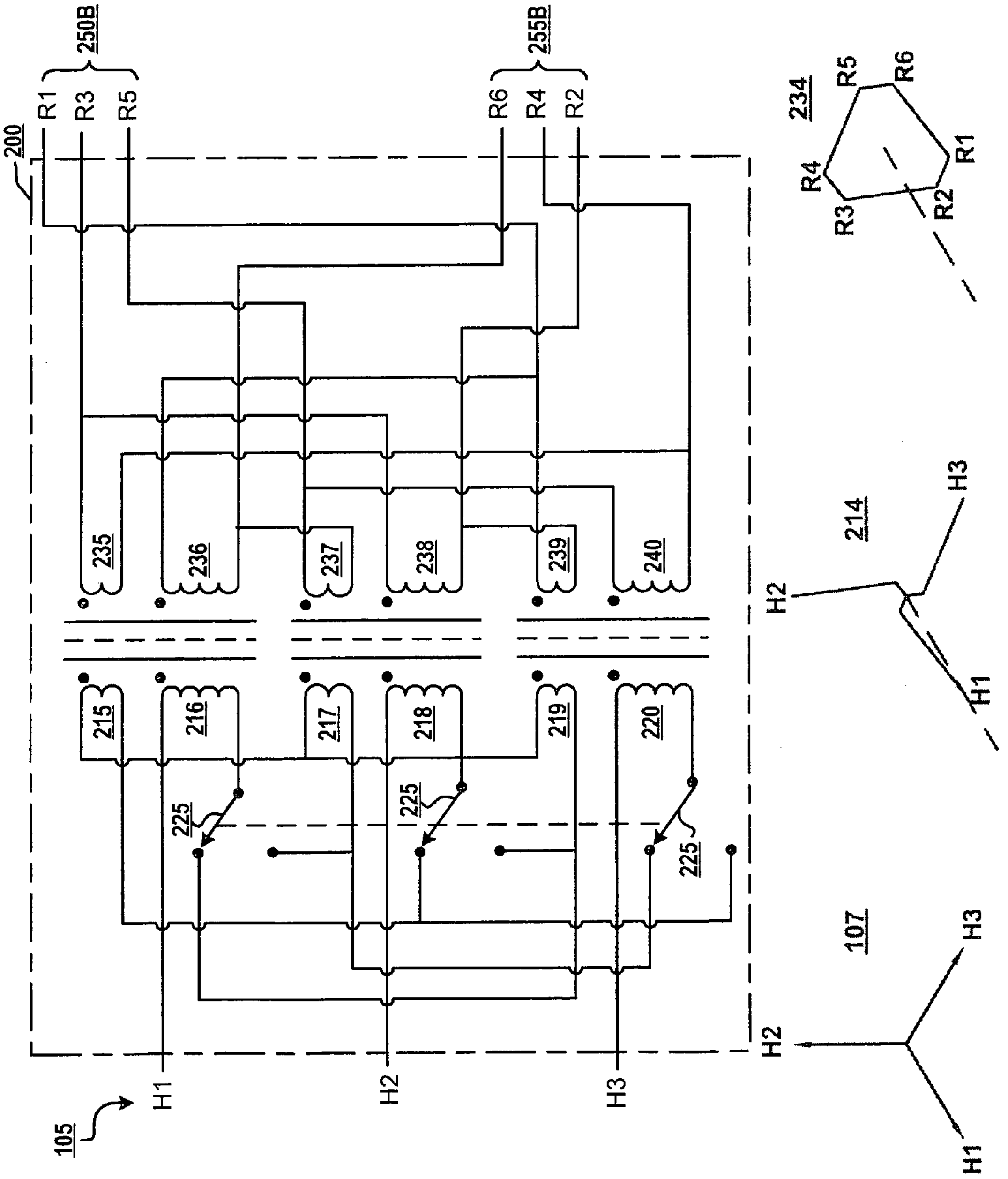

For ease of description, similar components within each of the series of transformers are provided similar lower digit reference numerals, while each transformer is assigned a leading reference numeral corresponding to the figure number (e.g. 1xx for FIG. 1, 2xx for FIG. 2). Also, no distinction is made in the reference numerals between A–B versions unless there is a functional difference between the two components being referenced. Components in A–B versions that exhibit different operational characteristics as a result of the position of the selector switch are identified within the description and/or assigned an A–B distinction (e.g., 150A–150B). Finally, since transformers of FIGS. 2A–2B to 4A–4B are similarly configured to the transformer of FIGS. 1A–1B, only FIGS. 1A–1B are described in detail. Only the primary functional characteristics of FIGS. 2A–2B to 4A–4B that are different from FIGS. 1A–1B are described in detail.

Turning specifically to FIGS. 1A and 1B, there is illustrated a first transformer with the three-pole, double throw selector switch (hereinafter "selector switch") in a first switch position (1A) and a second switch position (1B) for respective figures. Key components of transformer 100 include primary windings 110, selector switch 125, and secondary windings 130. Selector switch 125 is shown in the first switch position in FIG. 1A and the second switch position in FIG. 1B. The switch position is changeable once the transformer is placed on location in the field, and FIGS. 1A–1B (and the other A–B pairs presented herein) respectively represent a single transformer with an adjustable selector switch in two different positions.

Primary windings 110 include three corresponding first segments 115, 117, 119 and three corresponding second segments 116, 118, 120. First segments are illustrated as shorter segments than second segments in this illustration. Notably, the converse configuration holds true for FIGS. 3 and 4, described below. As stated above, the functionality attributed to the invention is primarily dependent on the different configurations on the primary windings when the selector switch is thrown rather than the lengths of the first segment and second segments relative to each other.

The first and second segments of the primary windings 110 are arranged in the vector relationship 112, 114 illustrated below the transformer 100 in FIGS. 1A–1B, respectively. As shown, primary windings 110 are arranged in a zigzag pattern with three knees. Each knee of the zigzag is established by one of the three poles of the double-throw selector switch 125. Each input H1-H2-H3 105 connects to corresponding ends of first segments 115, 117, 119. Input voltage vector 107 illustrates the arrangement of inputs H1-H2-H3 105, which input is the same for all the FIGS. (1A–1B to 5A–5B) in the illustrative embodiments.

Selector switch 125 is connected to corresponding ends of first segments 115, 117, 119 of primary windings 110. Selector switch 125 may be rotated to change the connection of segments 115, 117, 119 respectively to second segments 118, 120, 116 or respectively to second segments 120, 116, 118 of primary windings 110.

Like primary windings 110, secondary windings 130 of transformer 100 also comprise multiple segments 135, 137, 139 and other segments 136, 138, 140. These segments are arranged in the vector relationship 132, 134 illustrated below the transformer 100 in FIGS. 1A–1B, respectively. Other types of vector relationships are possible. As shown, secondary windings 130 are designed (or arranged) as a single polygon so that a three phase load (not shown) may be connected to either R1-R3-R5 output 150 or to R2-R4-R6 output 155. Transformer 100 has six (6) secondary terminals marked R1-R3-R5 and R2-R4-R6, which are referred to hereinafter as R1-R3-R5 output 150 and R2-R4-R6 output 155. In one embodiment, secondary windings associated with R2-R4-R6 output 150 lag secondary windings associated with R1-R3-R5 output 155 by 30° phase angle.

Transformer 100 is arranged so that the input to output phase relationship rotates 105° when the three-pole selector switch is thrown. Thus, with this illustrative embodiment, the long and short segments of the zigzag have a corresponding turns ratio of 6.078116:1, or as close to that ratio as practical. That ratio is rounded to the nearest whole number of turns or a whole number of turns plus one-half turn. In the illustrative embodiment, corresponding ends of the three first segments 115, 117, 119 are arranged as fixed input terminals (for H1-H2-H3 input 105) and corresponding ends of the three second segments 116, 118, 120 are arranged as the fixed neutral point of the input windings. The remaining six ends of the zigzag segments are arranged as selectable, isolated zigzag knee connections, which are selectable via the selector switch.

Four or more transformers designed according to the arrangement of transformer 100 in FIG. 1A–1B are useful to supply power to four or more six pulse converters (rectifiers), where there is a desire that the total current of the combined converter load has reduced harmonic content of 24 pulse characteristics. According to the illustrative embodiment, the phase relationship between the input power (voltage) and the output power has four possible values, 22.5°, 52.5°, 127.5°, or 157.5°. For the purposes of reducing harmonic currents, these phase relationships are equivalent to 7.5°, 22.5°, 37.5°, and 52.5°. Transformer 100 is designed to step down the input voltage (at H1-H2-H3 input 105) and provide phase shifting for harmonic cancellation.

Thus, with the embodiment illustrated by FIG. 1A, R1-R3-R5 output 150 lags H1-H2-H3 input 105 by 22.5°, while R2-R4-R6 output 155 lags input H1-H2-H3 by 52.5°. Also, in FIG. 1B, R1-R3-R5 output 150 lags H1-H2-H3 input 105 by 127.5°, while R2-R4-R6 output 155 lags H1-H2-H3 input 105 by 157.5°. Thus, with the illustrative embodiment, the R2-R4-R6 output 155 is 30° phase shifted from the R1-R3-R5 output 150.

Notably, although one transformer of the present invention may provide outputs for a six-pulse or twelve-pulse rectifier, in alternate embodiments, two transformers may be utilized together to provide 30° phase displaced, six-phase, isolated power for one twelve-pulse rectifier. Likewise, two or four transformers can be used for one twenty-four pulse rectifier needing 15° phase displaced twelve-phase power.

FIGS. 2A–2B through FIGS. 4A–4B illustrate transformers that are similarly configured/designed to that of FIGS. 1A–1B. However, the transformers of FIGS. 3A–3B and 4A–4B are designed with different turn ratios from transformer 100 of FIGS. 1A–1B and thus exhibit different operational characteristics, including different phase angle relationships. Also, as will be obvious from the figures, FIGS. 1A–1B and 2A–2B as well as FIGS. 3A–3B and 4A–4B are respectively distinguishable from each other because in both first transformers (1A–1B and 3A–3B), the long winding segments are connected to the input terminals and in both second transformers (2A–2B and 4A–4B), the short segments are connected to the input terminals. The drawing distinctions demonstrate that a transformer exhibiting the functional characteristics of the invention may be configured/built with either configuration. The input connections of FIGS. 5A–5B are similar to that of FIGS. 2A–2B.

As explained above, similar numerals are utilized to identify similar components, (i.e., the last two digits of each numeral identify similar components in different transformers, while the first digit reflects the number of the current figure being described (e.g., 3xx for components of FIG. 3, 4xx for FIG. 4 components). The specific differences in phase angle relationships and resulting harmonization characteristics are described for each respective transformer.

As with the first transformer of FIGS. 1A–1B, the arrangement in FIGS. 2A–2B through 4A–4B is useful to supply power to four or more six pulse converters (rectifiers), where there is a desire that the total current of the combined converter load has reduced harmonic content of 24 pulse characteristics. Also, for each transformer, corresponding ends of three first segments are arranged as fixed input terminals and corresponding ends of three second segments are arranged as the fixed neutral point of the input windings. Again, the remaining six ends of the zigzag segments are arranged as selectable, isolated zigzag knee connections, via the selector switch 125.

FIGS. 2A and 2B illustrates a second transformer with the selector switch in alternate positions. Secondary windings 130 of transformer 200 are arranged as a single polygon, secondary arrangement such that a three phase load may be connected to R1-R3-R5 output 250 or to R2-R4-R6 output 255. The phase angle relationship between the input voltage and the output voltage has four possible values for the purposes of reducing harmonic currents, 7.5°, 22.5°, 37.5°, 52.5°.

Transformer 200 is arranged so that the input to output phase relationship rotates 15° when the selector switch is thrown. Similar to transformer 100 of FIGS. 1A–1B, the turns ratio of the zigzag segments of transformer 200 is also about 6.078116:1. In FIG. 2A, R1-R3-R5 output 250 leads H1-H2-H3 input 105 by 37.50°, while R2-R4-R6 output 255 leads H1-H2-H3 input 105 by 7.5°. Also, in FIG. 2B, R1-R3-R5 output 250 leads H1-H2-H3 input 105 by 52.5°, while R2-R4-R6 output 255 leads H1-H2-H3 input 105 by 22.5°.

Figure 3A:
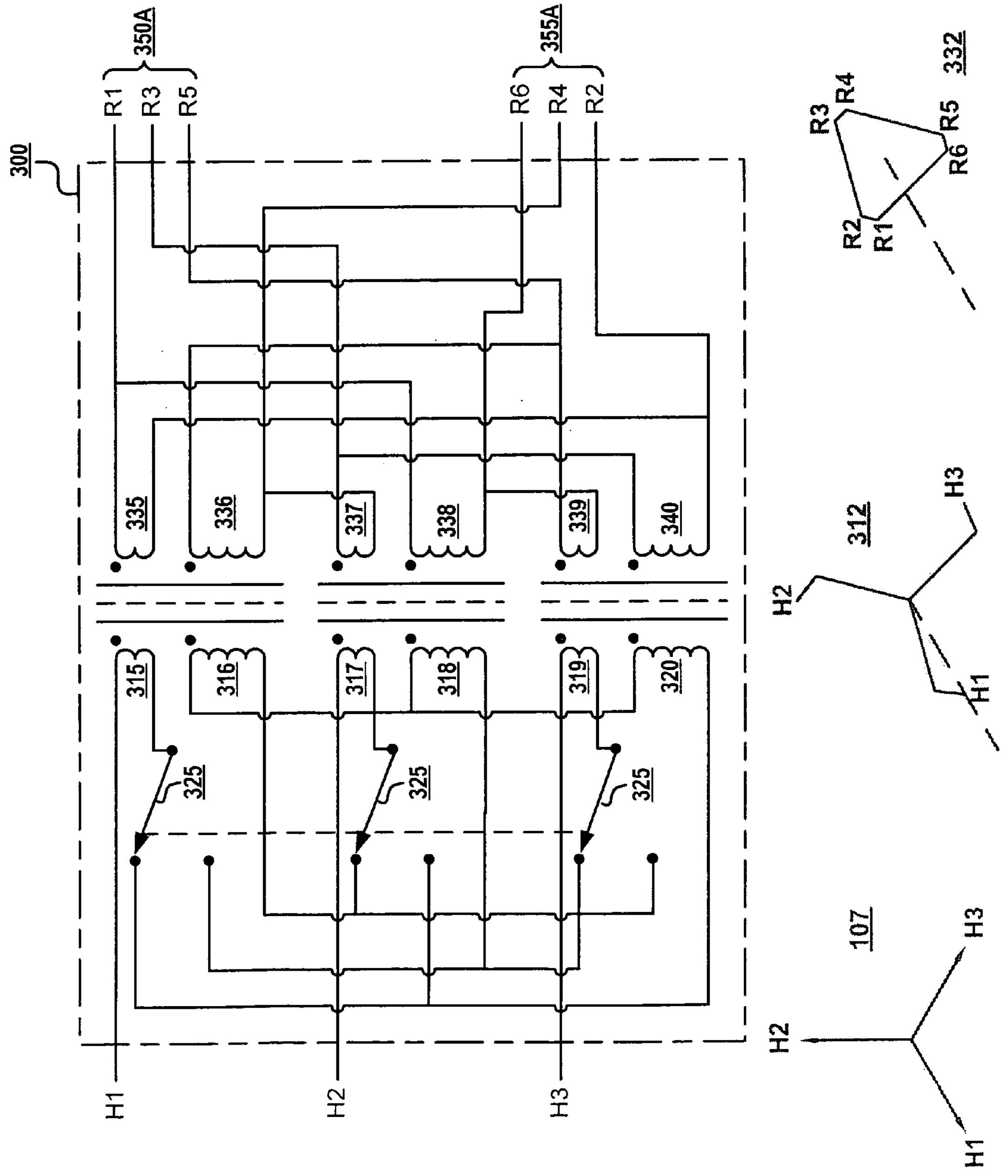
FIGS. 3A and 3B illustrate two schematic and vector diagrams of a third transformer with different, select switch positions according to one illustrative embodiment of the invention.
Figure 3B:
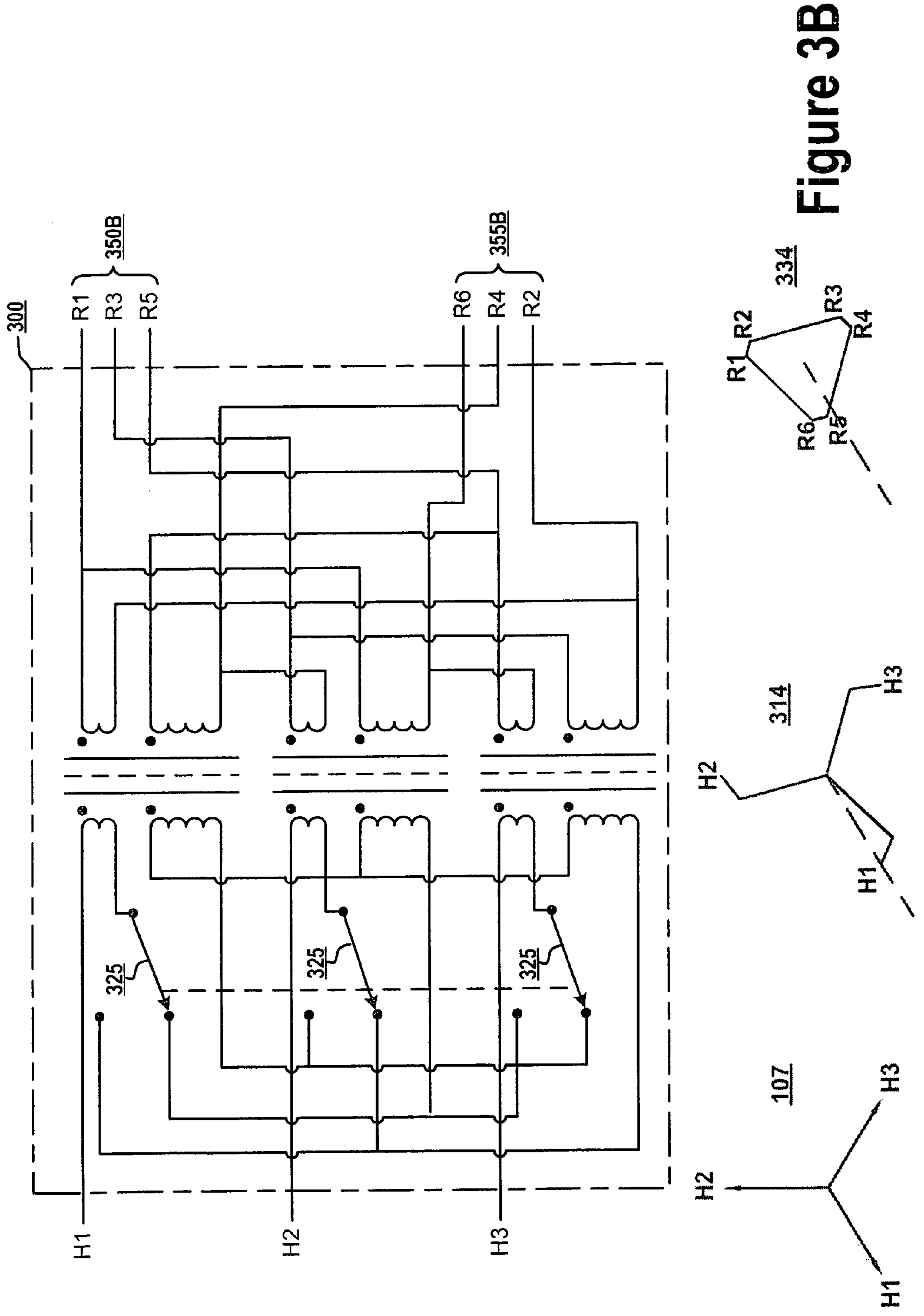

FIGS. 3A–3B illustrate a third transformer with selector switch in different positions. Primary windings 310 include three first segments 315, 317, 319 and three long segments 316, 318, 320. These segments of the primary windings are arranged in the vector relationship 312, 314 illustrated below transformer 300 in FIGS. 3A–3B. The windings of transformer 300 are arranged so that the input to output phase relationship rotates 90° when said three-pole selector switch is thrown. For this embodiment, the first and second segments of the zigzag have a corresponding turns ratio of 2.73205:1, or as close to that ratio as practical rounded to the nearest whole number of turns or whole number of turns plus one-half.

Secondary windings 330 of transformer 300 include a single polygon, secondary arrangement such that a three phase load may be connected to R1-R3-R5 output 350 or to R2-R4-R6 output 355. The phase relationship between the input voltage and the output voltage has four possible values, 37.5°, 52.5°, 127.5°, or 142.5°. For the purpose of reducing harmonic currents, these phase relationships are equivalent to 7.5°, 22.5°, 37.5°, 52.5°. In FIG. 3A, R1-R3-R5 output 350 lags H1-H2-H3 input 105 by 37.5°, while R2-R4-R6 output 355 lags H1-H2-H3 input 105 by 52.5°. Also, in FIG. 3B, R1-R3-R5 output 250 lags H1-H2-H3 input 105 by 127.5°, while R2-R4-R6 output 355 lags H1-H2-H3 input 105 by 142.5°.

Figure 4A:
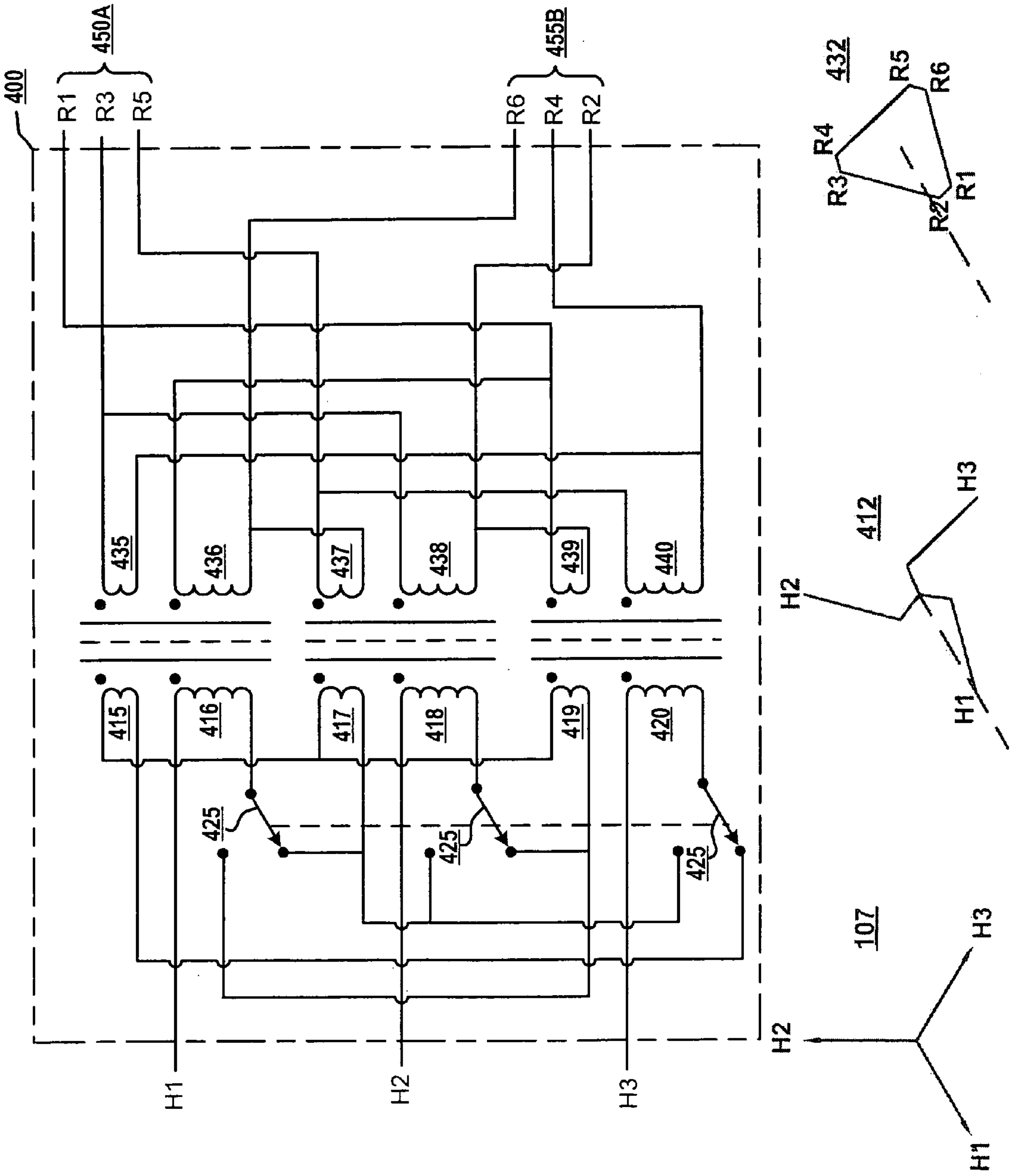
FIGS. 4A and 4B illustrate two schematic and vector diagrams of a fourth transformer with different, select switch positions according to one illustrative embodiment of the invention.
Figure 4B:
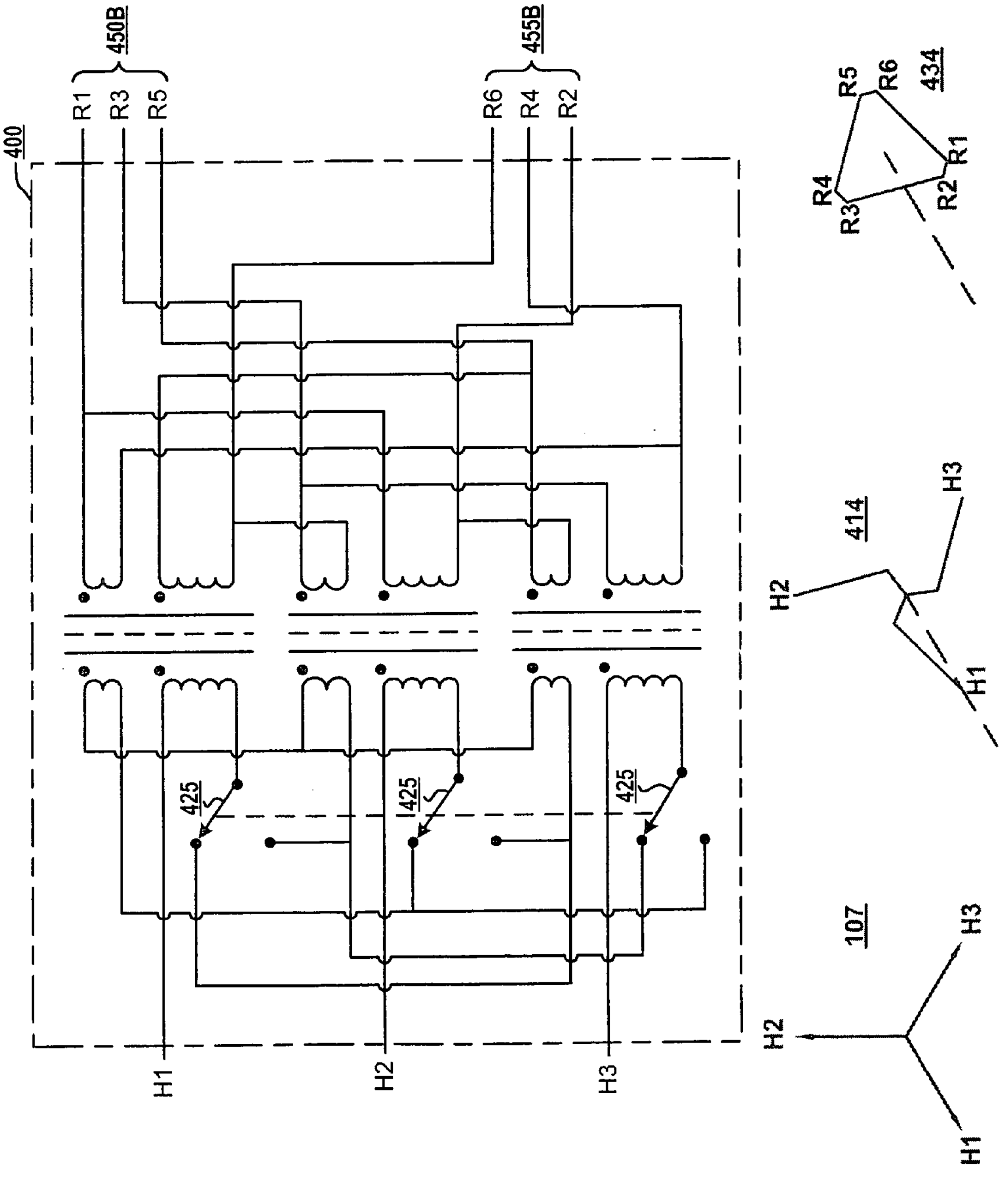
Figure 5A:
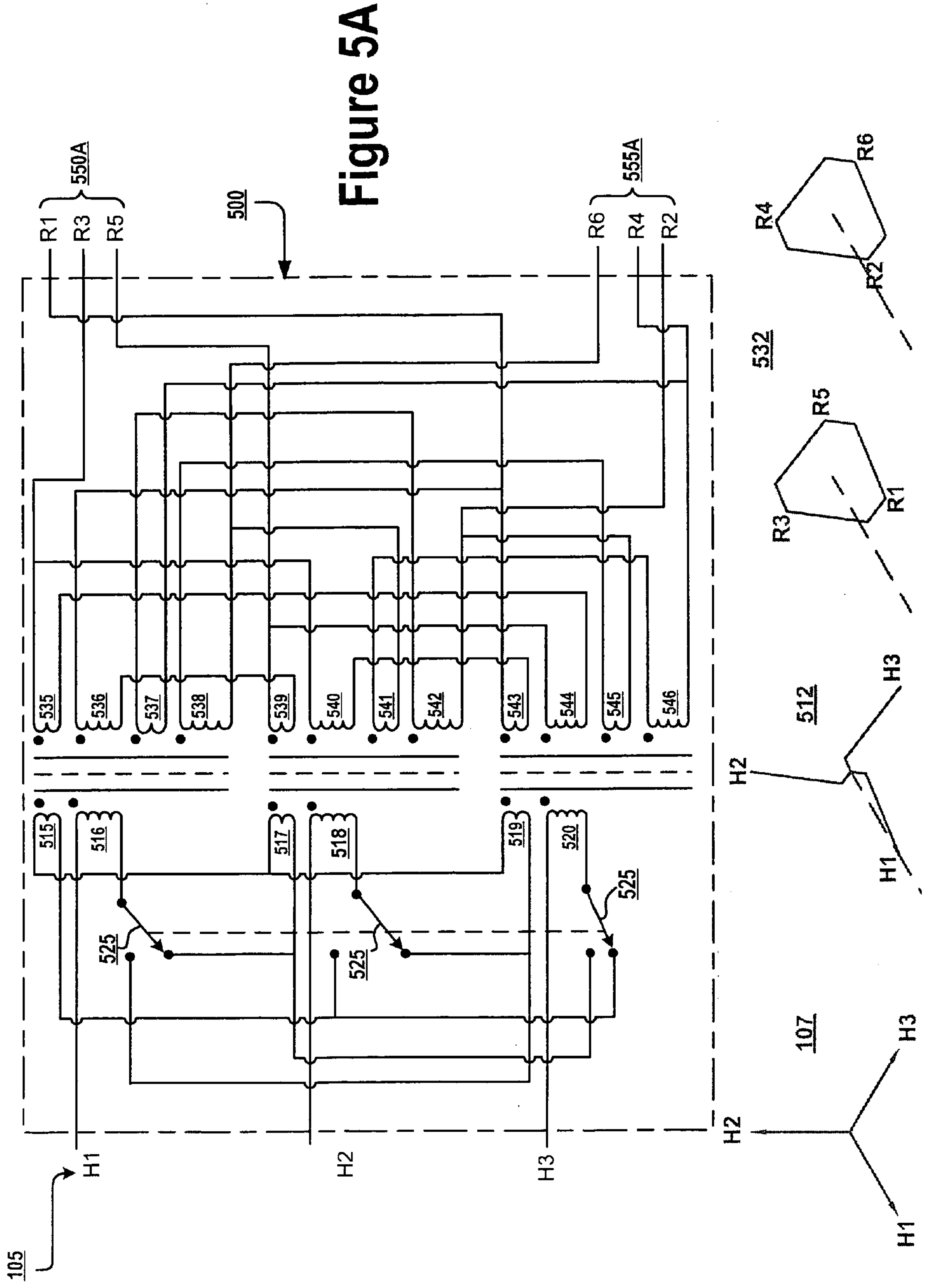
FIGS. 5A and 5B illustrate two schematic and vector diagrams of a fifth transformer with different, select switch positions according to one illustrative embodiment of the invention.
Figure 5B:
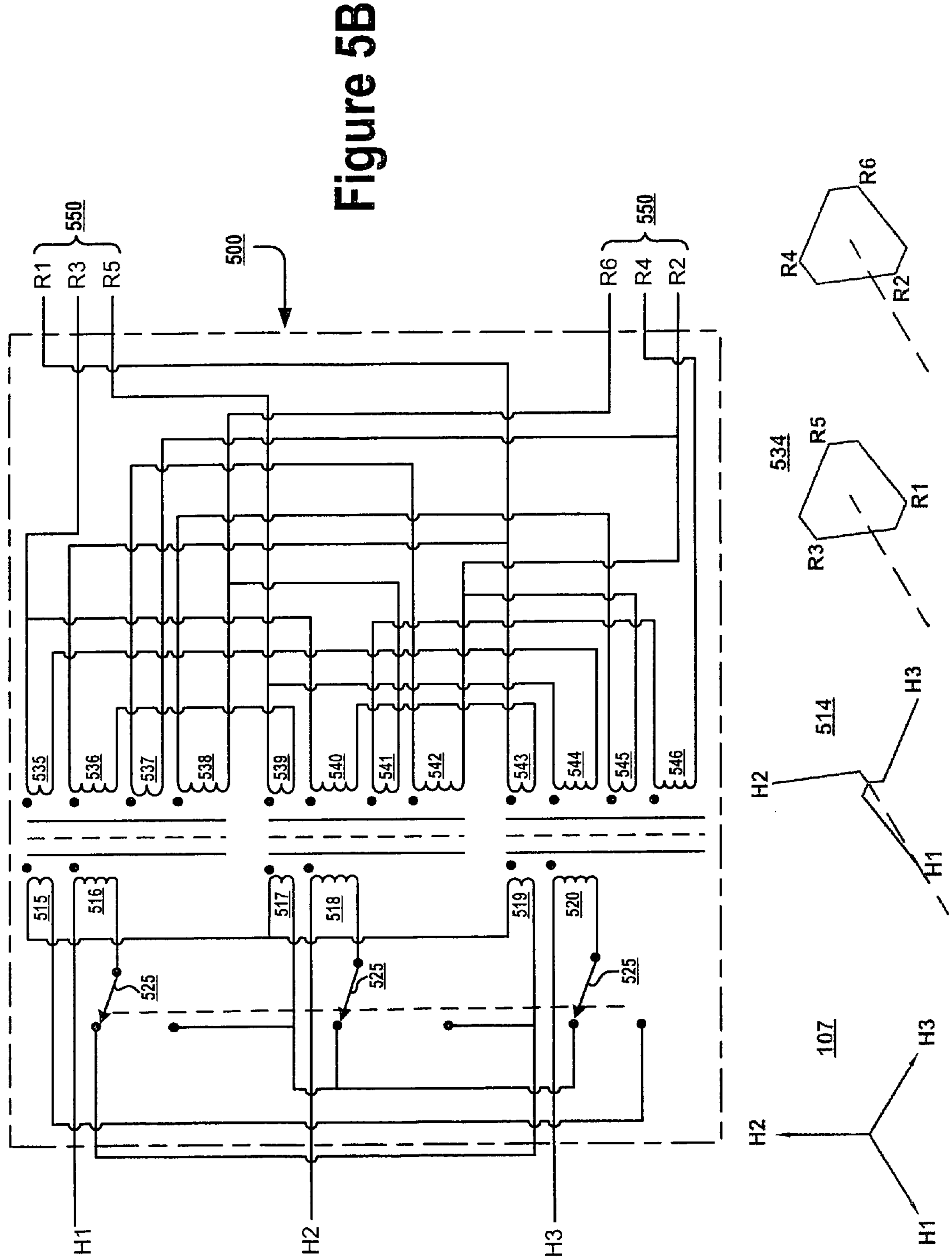

FIGS. 4A–4B illustrates a fourth transformer with the selector switch positioned in a first configuration and second configuration, respectively. The phase relationship between the input voltage and the output voltage has four possible values for the purposes of reducing harmonic currents, 7.5°, 22.5°, 37.5°, 52.5°. Transformer 400 is arranged so that the input to output phase relationship rotates 30° when said selector switch is thrown. Similar to transformer 300, the turns ratio of the zigzag segments of transformer 400 is also about 2.73205:1.

In FIG. 4A, R1-R3-R5 output 450 leads H1-H2-H3 input 105 by 22.5°, while R2-R4-R6 output 455 leads H1-H2-H3 input 105 by 7.5°. In FIG. 4B, R1-R3-R5 output 450 leads H1-H2-H3 input 105 by 52.5°, while R2-R4-R6 output 455 leads H1-H2-H3 input 105 by 37.5°.

FIGS. 5A–5B illustrate a fifth transformer configured with selector switch in alternate positions yielding different output phase angle relationships. The primary winding and selector switch arrangement of transformer 500 is substantially equivalent to that of transformer 200 of FIGS. 2A–2B. However, the secondary winding arrangement of transformer 500 is a dual polygon suited to use with twelve pulse converters. Thus, unlike the previously described transformers, transformer 500 includes a double polygon, secondary winding arrangement. With this arrangement, a three phase load may be connected to R1-R3-R5 output 550 and/or to R2-R4-R6 output 555. Unlike the previous transformers (e.g., transformer 400 of FIG. 4, which may be utilize with other similar transformers to supply power to "four or more" six pulse converters), the transformer arrangement in FIGS. 5A–5B is preferably utilized for supplying power to two (2) or more twelve (12) pulse converters (rectifiers), where there is a desire that the total current of the combined converter load has reduced harmonic content of 24 pulse characteristics. Also, with this configuration, the phase relationship between the output voltage and the input voltage has only two (not 4) possible values for the purposes of reducing harmonic currents, 7.5°/37.5° or 22.5°/52.5°.

The transformer 500 in this embodiment is arranged so that the input-to-output phase relationship rotates 15° when the selector switch is thrown. In FIG. 5A, R1-R3-R5 output 550 leads H1-H2-H3 input 107 by 37.5°, while R2-R4-R6 output 555 leads H1-H2-H3 input 105 by 7.5°. However, in FIG. 5B, R1-R3-R5 output 550 leads H1-H2-H3 input 105 by 52.5°, while R2-R4-R6 output 555 leads H1-H2-H3 input 105 by 22.5°.

From a field operation/implementation standpoint, the invention provides a method for supplying power to a number of 12-pulse drives, where it is desirable that approximately half of the drives are phase shifted a pre-selected number (X) of degrees (e.g. X=15 degrees) away from the other half of the drives. From the primary system (or power source), the drives together appear as a 24-pulse load.

Two or more transformers according to the arrangement of transformer 500 in FIG. 5A–5B are useful to supply power to two or more twelve pulse converters (rectifiers), where there is a desire that the total current of the combined converter load has reduced harmonic content of 24 pulse characteristics. According to the illustrative embodiment, the phase relationship between the input power (voltage) and the output power has two possible values, 7.5°/37.50 or 22.5°/52.5°.

In one implementation, the windings of the transformer are provided with taps, which serve to adjust the effective turns between the ends of the windings. This implementation provides similar functional phase characteristics but enables the range of the input-to-output voltage to be changed depending on the number of turns between the first and second segments of the windings. Those skilled in the art appreciate that providing taps on the windings of the transformer is an extension of the main invention and falls within the scope of the invention.

The present invention provides a solution to the problems of harmonic currents and provides several identifiable advantages for addressing these problems over other methods proposed, including those described in U.S. patent application Ser. No. 6,169,674. Among these advantages are the following:

(1) The voltage impressed across each pair of input windings is only 57.7% for the same input voltage. This allows the use of less volume and lowers the cost of insulating material in the construction. It also allows the coils to be wound with fewer turns and therefore requires less labor.

(2) Only a single end of each pair of input windings is connected directly to the power source. The other end of each input winding pair is connected to the neutral point. This allows a reduction in the use of insulating material in and around the input windings.

(3) The working voltages impressed on the selector switch are lower while the current remains the same. This allows the use of a selector switch that contains less insulation and/or smaller clearances, both phase-to-phase and terminal-to-terminal within each phase. These reduced working voltages are more pronounced in transformers of FIGS. 2, 4 and 5(A–B).

(4) The selector switch is not directly exposed to the lightning and switching transient voltages that occur on the input lines. Again this arrangement allows the use of a selector switch that contains less insulation and/or smaller clearances. Again, this advantage is more pronounced in transformers of FIGS. 2, 4 and 5(A–B).

With the present invention, harmonic distortion in a multiple phase power system is controlled by enabling different phase relationships to be set, and changed, in the field, between the devices (load) being powered and the power source providing the power. This has particular application, for example, in canceling harmonics caused by multiple six-pulse variable frequency drives used for controlling connected three-phase induction motors that operate electric submersible pumps.

Other transformer designs with other phase angle relationships will be obvious to those skilled in the art. Other turns ratios of the zigzag segments will be obvious to those skilled in the art. Also obvious to those skilled in the art, the power input and power output often may be reversed. For each described transformer, the output windings may have several alternate arrangements, including single delta, single wye, single fixed zigzag, single selectable zigzag, single fixed polygon, single selectable polygon, dual polygon, delta/wye, dual zigzag, or other arrangements known in the art.

Finally, while the invention has been particularly shown and described with reference to a preferred embodiment, it will be understood by those skilled in the art that various changes in form and detail may be made therein without departing from the spirit and scope of the invention.

What is claimed is:

1. A transformer comprising:

a set of primary windings having three first segments and three second segments arranged in a zigzag pattern with three points of contact; and a three pole, selector mechanism, each pole being selectively connected to corresponding ends of respective ones of said first segments, wherein said selector mechanism selectably connects said primary windings in one of multiple serial configurations that each exhibit different phase characteristics, whereby an output-to-input phase relationship of said transformer when said selector mechanism connects said primary windings in a first configuration is rotated a pre-determined number of degrees from the output-to-input phase relationship of the transformer when the selector mechanism connects said primary windings in a second configuration.

2. The transformer of claim 1, wherein:

a turns ratio of said three first segments relative to said three second segments of the primary windings are pre-selected to yield the determinable number of degrees phase shift between the first configuration and the second configuration, wherein the turns ratio is selected to be one of two ratios determined from a whole number of turns and a whole number of turns plus one half.

3. The transformer of claim 2, wherein:

the configuration of said selector mechanism is selectable while the transformer is attached to a load and provides a total degree swing of X degrees that is utilized when performing load balancing; and the first configuration of the selector mechanism rotates the output negative 0.5X degrees and the second configuration of the selector mechanism rotates the output 0.5X degrees.

4. The transformer of claim 1, further comprising secondary windings electromagnetically coupled with the primary windings and which provides one or more three-phase output terminals for connecting a three phase load, wherein when the secondary windings provide two sets of output terminals, output at the first set of output terminals is phase shifted from the output of the second set of output terminals.

5. The transformer of claim 4, wherein:

the first and second configurations of said selector mechanism provides a total degree swing of X degrees, where the first configuration rotates the output negative 0.5X degrees and the second configuration rotates the output 0.5X degrees; and a first output of the secondary windings is phase rotated Y degrees from the second output;

wherein four possible input-to-output phase shifts are provided by the transformer to enable harmonic cancellation, including:

a first phase shift when said selector switch is in the first operating position and a load is attached to the first output;

a second phase shift when said selector switch is in the first operating position and the load is attached to the second output;

a third phase shift when said selector switch is in the second operating position and a load is attached to the first output; and a fourth phase shift when said selector switch is in the second operating position and the load is attached to the second output.

6. The transformer of claim 5, wherein:

when said secondary windings are arranged as a single polygon exhibiting a predetermined vector relationship that enables the connection of the load to either of the two sets of output, said two outputs power one to two six-pulse rectifiers; and when said secondary windings include a double polygon, such that a three phase load connects to individual polygons of the double polygon, such that the phase relationship between the input voltage and the output voltage has only two possible values for reducing harmonic currents, said two outputs powers a twelve pulse rectifier.

7. The transformer of claim 4, wherein said transformer is a three phase induction transformer.

8. The transformer of claim 1, wherein said selector mechanism is a three phase, double throw, selector switch that is selectably connected to said primary windings in one of two positions to yield the first configuration and the second configuration, respectively.

9. A system comprising:

a three phase power source;

one or more three phase loads;

at least one three phase induction transformer for each of said one or more three phase loads, said transformer having three phase inputs coupled to the three phase power source and at least one three phase output providing a connection to one of said one or more three phase loads, wherein said transformer provides selectable reduction in harmonic distortions of said three phase power source, each of said at least one three phase transformer including:

a set of primary windings having three first segments and three second segments arranged in a zigzag pattern with three points of contact; and a three pole, selector mechanism, each pole being selectively connected to corresponding ends of respective ones of said first segments, wherein said selector mechanism selectably connects said primary windings in one of multiple serial configurations that each exhibit different phase characteristics, whereby an output-to-input phase relationship of said transformer when said selector mechanism connects said primary windings in a first configuration is rotated a pre-deteinrined number of degrees from the output-to-input phase relationship of the transformer when the selector mechanism connects said primary windings in a second configuration.

10. The system of claim 9, wherein:

a turns ratio of said three first segments relative to said three second segments of the primary windings are pre-selected to yield the determinable number of degrees phase shift between the first configuration and the second configuration, wherein the turns ratio is selected to be one of two ratios determined from a whole number of turns and a whole number of turns plus one half.

11. The system of claim 9, wherein:

heo configuration of said selector mechanism is selectable while to transformer is attached to a load and provides a total degree swing of X degrees that is utilized when performing load balancing; and the first configuration of the selector mechanism rotates the output negative 0.5X degrees and the second configuration of the selector mechanism rotates the output 0.5X degrees.

12. The system of claim 11, wherein each of said at least one transformer further comprises secondary windings electromagnetically coupled to the primary windings and which provides one or more three-phase output terminals for connecting a three phase load, wherein:

when the secondary windings provide two sets of output terminals, output at the first set of output terminals is phase shifted from the output of the second set of output terminals; and when said secondary windings include a single polygon exhibit a predetermined vector relationship that enables the connection of the load to either of the two sets of output, said two outputs each powers a six-pulse rectifier; and when said secondary windings include a double polygon, such that a three phase load connects to individual polygons of the double polygon, such that the phase relationship between the input voltage and the output voltage has only two possible values for reducing harmonic currents, said two outputs power a twelve pulse rectifiers.

13. The system of claim 12, wherein four possible input-to-output phase shifts are provided by the transformer to enable harmonic cancellation, including:

a first phase shift when said selector switch is in the first operating position and a load is attached to the first output;

a second phase shift when said selector switch is in the first operating position and the load is attached to the second output;

a third phase shift when said selector switch is in the second operating position and a load is attached to the first output; and a second phase shift when said selector switch is in the second operating position and the load is attached to the second output.

14. The system of claim 9, wherein said selector mechanism is a three phase, double throw, selector switch that is selectably connected to said primary windings in one of two positions to yield the first configuration and the second configuration, respectively.

15. A method comprising:

providing multiple three phase transformers to power four or more 6-pulse rectifiers or 2 or more 12-pulse rectifiers such tat the hannonic distortions are substantially reduced, wherein each transformer includes a selector switch, a three phase input and a pair of three phase outputs that together enable four different input-to-output phase shifts by a determinable number of degrees and wherein a first and second configuration of the selector switch provides a total degree swing of X degrees, where the first configuration rotates the output negative 0.5X degrees and the second configuration rotates the output 0.5X degrees;

coupling a three phase power source to said three phase input of each of said multiple three phase transformers;

attaching one of said 6-pulse or 12-pulse rectifiers to at least one of the pair of three phase outputs for each one of said multiple three phase transformers;

performing load balancing to reduce said harmonic distortions by changing a position of said selector switch in selected ones of said multiple three phase transformers to adjust the output-to-input phase shift relationship to provide reduced harmonic content of 24-pulse characteristics.

16. The method of claim 15, wherein each of said multiple transformer comprises:

a set of primary windings having three first segments and three second segments arranged in a zigzag pattern with three points of contact; and a three pole, selector mechanism, each pole being selectively connected to corresponding ends of respective ones of said first segments, wherein said selector mechanism selectably connects said primary windings in one of multiple serial configurations that each exhibit different phase characteristics, whereby an output-to-input phase relationship of said transformer when said selector mechanism connects said primary windings in a first configuration is rotated a pre-determined number of degrees from the output-to-input phase relationship of the transformer when the selector mechanism connects said primary windings in a second configuration; and said method further comprising selecting among one of said first configuration and said second configuration as the initial position for performing load balancing.

17. The method of claim 16, further comprising:

determining when said load is not balanced, wherein said determining includes measuring with a clip on ammeter at the transformer;

removing said power source from at least one of the multiple transformers; changing the configuration of the selector switch of the at least one transformer; and re-energizing the at least one transformer with the selector switch in the next configuration.

18. A transformer comprising:

at least three input terminals arranged for electrical connection to an external three phase power source;

at least three output terminals arranged for electrical connection to an external multiple phase load;

at least a first pair of primary windings, a second pair of primary windings and a third pair of primary windings wherein:

each pair of primary windings has a first winding segment and a second winding segment;

each winding segment has a first end and a second end;

each pair of said primary windings is magnetically coaxial;

corresponding first end of each of three first winding segments is permanently electrically connected to one of said input terminals; and corresponding first end of each of three second winding segments are permanently electrically connected together to form an electrical neutral; and a connection mechanism having at least a first selectable operating configuration and a second selectable operating configuration arranged for selection after the transformer is placed in the service location, wherein:

the first selectable operating configuration electrically connects (1) the second end of the first winding segment of the first pair of windings to the second end of the second winding segment of the second pair of windings, (2) the second end of the first winding segment of the second pair of windings to the second end of the second winding segment of the third pair of windings, and (3) the second end of the first winding segment of the third pair of windings to to second end of the second winding segment of the first pair of windings; and the second selectable operating configuration electrically connects (1) the second end of the first winding segment of the first pair of windings to the second end of the second winding segment of the third pair of windings, (2) the second end of the first winding segment of the second pair of windings to to second end of the second winding segment of the first pair of windings, and (3) the second end of the first winding segment of the third pair of windings to the second end of the second winding segment of the second pair of windings;

wherein the phase relationship of the transformer output relative to the transformer input when the connection mechanism is positioned in the first operating configuration is different from the phase relationship between the transformer output and the transformer input when the connection mechanism is positioned in the second operating configuration.

* * * * *

UNITED STATES PATENT AND TRADEMARK OFFICE

CERTIFICATE OF CORRECTION

PATENT NO. : 7,112,946 B2
APPLICATION NO. : 10/899728
DATED : September 26, 2006
INVENTOR(S) : Donald W. Owen It is certified that error appears in the above-identified patent and that said Letters Patent is hereby corrected as shown below:

In Claim 11, at column 11, line 18, delete “heo” and insert --the--.

In Claim 11, at column 11, line 19, delete “while to” and insert --while the--.

In Claim 15, at column 12, line 4, delete “tat the hannonic” and insert --that the harmonic--.

Signed and Sealed this

Twenty-sixth Day of December, 2006

JON W. DUDAS

*Director of the United States Patent and Trademark Office*